INVENTOR.
DOUGLAS P. ADAMS
BY Wade Koontz
Sherman H. Goldman
ATTORNEYS

NOMOGRAPHIC COMPUTER SCANNING MEANS INCLUDING CANTILEVER MEANS TO SUPPORT THE FILM MEMORY

Filed March 4, 1964 2 Sheets-Sheet 2

INVENTOR.
DOUGLAS P. ADAMS

BY Wade Koontz and Sherman H. Goldman

ATTORNEYS

United States Patent Office 3,369,126

Patented Feb. 13, 1968

3,369,126

NOMOGRAPHIC COMPUTER SCANNING MEANS INCLUDING CANTILEVER MEANS TO SUPPORT THE FILM MEMORY

Douglas P. Adams, Cambridge, Mass., assignor to the United States of America as represented by the Secretary of the Air Force Filed Mar. 4, 1964, Ser. No. 349,513
5 Claims. (Cl. 250—219)

This invention relates generally to film scanners and, more particularly, to a machine which reads countable bits recorded on film to accord with soutions of a nomogram. Basically the device comprises a rotating support for a film memory with optical systems on both sides thereof for producing signals capable of being converted to electrical impulses.

Nomography has been combined with electronics to form an automatic, digital-graphical hybrid known as a nomographic computer. A nomogram has a scale for each variable represented wherein each scale has a single value or a set of values associated with every point thereon by express or implied computation. Conversely, the associated value would cause the point to be placed in its position on its scale in order to imply the value to the observer. The nomogram is capable of being converted to a pattern of marks recorded on film or magnetic tape which is capable of being read by photoelectric cells or tape reading means such that a digital counting system may be utilized to compute desired values for a particular equation repersented by a bit nomogram. This invention concerns the reading of such bit memories by optical-mechanical means.

The theory and operation of nomograms with respect to a computing system may be found in an article entitled, "Countable-Bit Nomographic Electronic Computation-Noel," by Douglas P. Adams, which appears in the book "Workship on Computer Organization," by Spartan Books, Inc., copyright 1963.

Previously, in order to accomplish read-out of countable bits on film a moving optical system with a fixed memory was proposed, the description of which may be found in my co-pending application Ser. No. 349,512, titled "Nomographic Computer Scanning Means," filed on even date herewith. However, it was found that by maintaining the optical system fixed with a moving memory, higher speeds of operation were obtainable and the unit could be more easily manufactured with a lighter weight.

Accordingly, it is a primary object of this invention to provide a nomographic reading system which attains higher speeds and enables the use of higher density bit patterns than that heretofore achieved.

It is another object of this invention to provide a film disk scanning system which enables a reduction of vibration due to hydrodynamic stabilization of the film on which countable bits are recorded.

It is still another object of this invention to provide a moving memory, fixed optics scanning system which enables the utilization of two solutions to every revolution by the introduction of double bit densities.

It is a further object of this invention to provide a nomographic computer scanning system which may be easily manufactured of conventional, currently available materials that lend themselves to standard mass production manufacturing techniques.

These and other advantages, features and objects of the invention will become more apparent from the following description taken in connection with the illustrative embodiment in the accompanying drawings, wherein.

Figure 2:
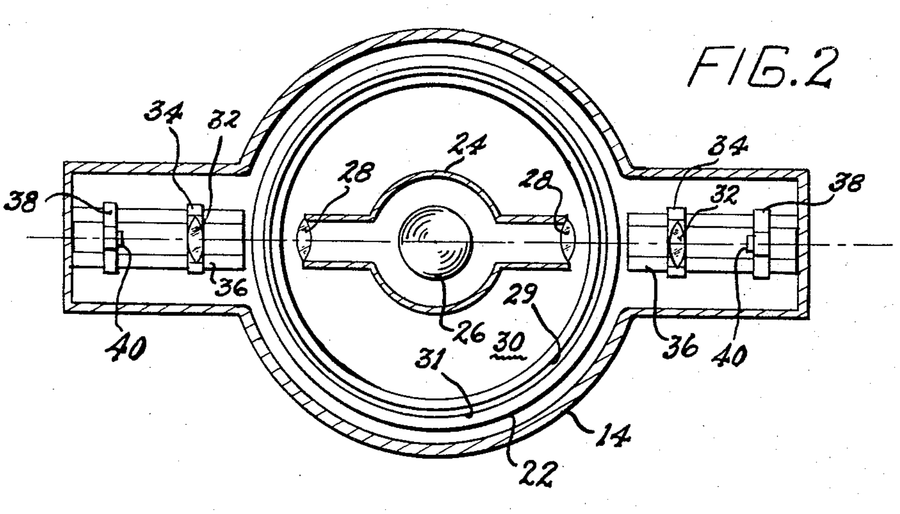
FIGURE 2 is a top view, partly in section, of the apparatus of FIGURE 1.
Figure 1:
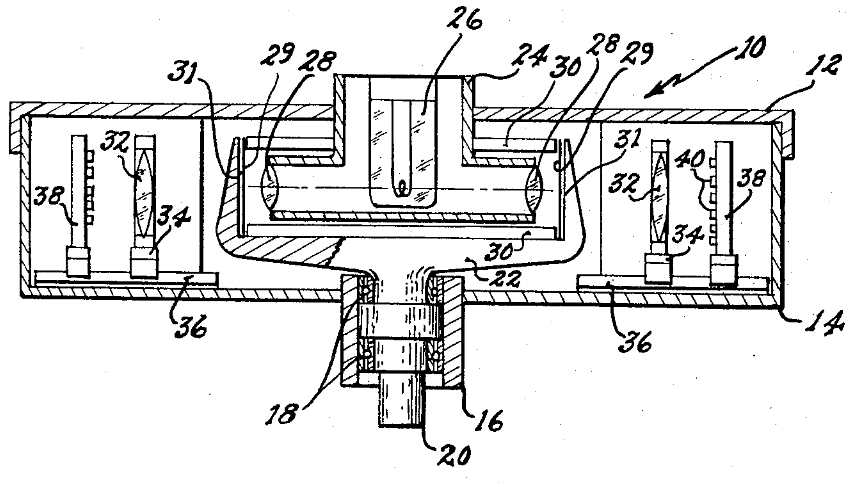
FIGURE 1 is a partially schematic representation in elevation of a moving memory, fixed optical scanning system.

Referring to FIGURES 1 and 2, there is shown an outer casing 10 which forms an enclosure for the device. The outer casing may be made in any desired manner; however, as shown, the top portion 12 is made to overlap and form a cover for the container portion 14. The cover 12 and the bottom of the container portion 14 have apertures for mounting a light source and optical housing 24 and a rotating film holder 22, respectively.

The light source and optical housing 24 is fixedly secured in the aperture of the cover 12 of the casing 10 and has a high intensity light bulb 26 centrally mounted on the axis of the cover aperture. The bulb 26 would be connected to a source of electric power through a switch means in a conventional manner (not shown). At the ends of the light source and optical housing 24 are mounted lenses 28 at diametrically opposite positions to focus the light emanating from the bulb onto a film memory. An image is formed by lens 32 on an element which converts light pulses into electrical pulses for a computing element.

The rotating memory support is indicated at 22 and comprises a cylinder which is affixed in cantilever fashion to a shaft 20 for rotation therewith. The shaft 20 is arranged to rotate in bearings 18 which are housed in a cylindrical journal housing 16 in the aperture at the bottom of container portion 14. The driving means for the shaft 20 may be of any conventional means, for example, an electric motor or a turbine wheel.

The film, which comprises the memory which is to be read for solution of a nomogram, comprises a film 29 which is circularly arranged and which contains the bit memory with the bits of information applied thereto in rasters, i.e., evenly spaced rulings or columns of bits. The bits could either be cutouts in an opaque piece of film or, alternatively, could be transparent portions on an opaque field. The light which emanates from the clear portions of the film and is imaged on the photocell means is utilized for conversion into the electrical pulses required by a computing element.

The film, therefore, is mounted to the vertical portions 31 of the film cylinder 22, and light is required to be projected through lenses 28, onto and illuminating the film 29 on the cylinder 22. The cylinder may be constructed with its upright portions 31 of transparent plastic or glass or might be made to have apertures therein for allowing passage of light.

Light from the bulb 26, having been projected through lenses 28 onto clear portions on the film 29, where the bits of information are indicated, passes through the cylinder 31 to be focused by a second lens 32 mounted in lens holder 34 of a conventional type which in turn is secured to a base 36 fixedly mounted to the bottom of the container portion 14 of the casing 10. The lens 32 directs the light energy to a photodiode holder 38 which contains a series of photodiodes 40 which converts light energy into the electrical pulses required by a conventional computer element.

The foregoing device is capable of utilizing a memory bit density of 250 bits per inch and when run with a conventional motor driving a gear reduction box has the ability to produce approximately 200 solutions per second while providing output voltages of 10 volts minimum. The total diameter of the unit is approximately 6 inches. With a double optical system, as shown, two solutions are possible in the same period.

Any conventional type of clamping means could be utilized to secure the film to the vertical wall portions 31 of the film cylinder 22. As shown in FIGURES 1 and 2, disks 30 may be provided; one being secured to the base of the housing 24 and the other being secured to an upper cylindrical portion of the light source and optical housing 24. The disks 30 are arranged such that the space between the ends thereof and the wall 31 are sufficient for the insertion of the film. When the walls are transparent such as of glass or Plexiglas, the forces caused by rotation would tend to hold the film against the walls.

Figure 4:
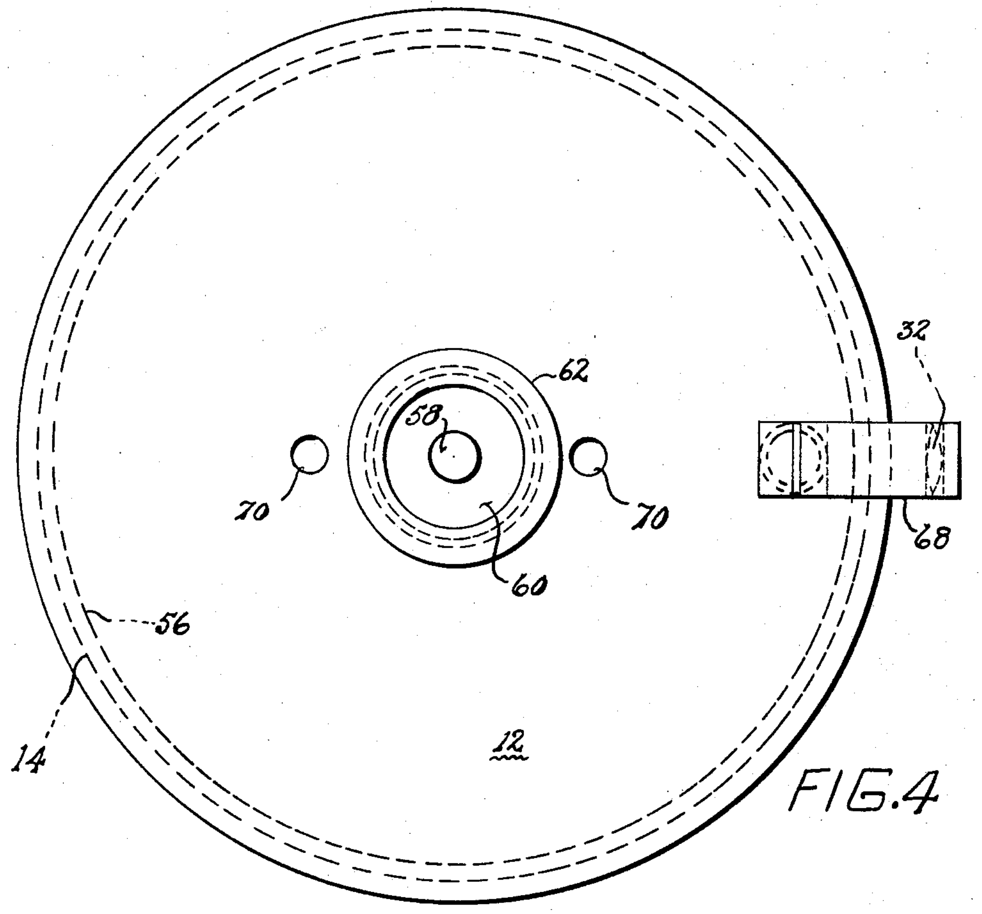
FIGURE 4 is a top view of the apparatus of FIGURE 3.
Figure 3:
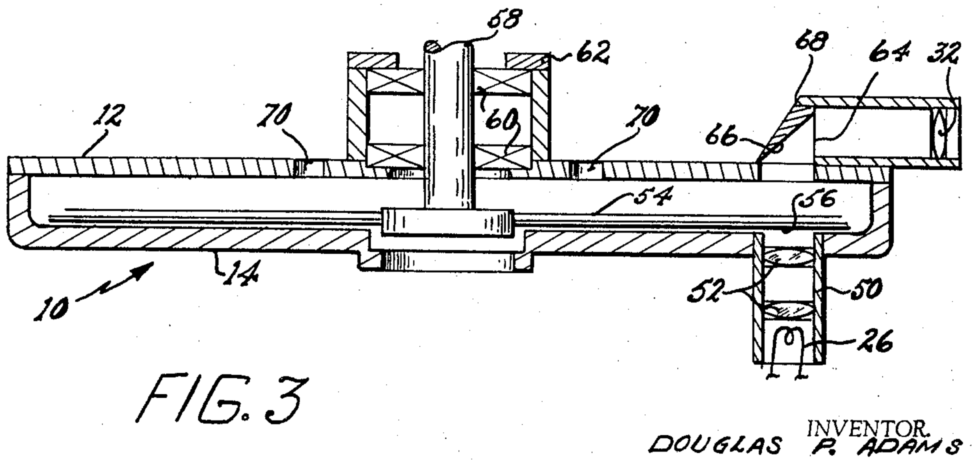
FIGURE 3 is a partially schematic representation in elevation of an alternative embodiment of the moving memory, fixed optics scanning system.

The embodiment shown in FIGURES 3 and 4 utilizes a flat disk memory which is more easily written and, in addition, allows the design to lend itself to the application of hydrodynamic stabilization for the film. In this embodiment, the casing 10 has its container 14 generally dish-shaped while the rotating element is mounted to the cover 12. The optical system in this embodiment is arranged at one end of the casing 10 for application of light rays in a manner similar to that described relative to FIGURES 1 and 2. The bottom of the container portion 14 has a housing 50 for mounting of the high intensity light source 26 and a pair of lenses 52 which function to apply the light to the moving memory. The memory comprises a disk-shaped film 54 which rests on a rotating disk 56. Rotation of disk 56 is achieved by means of its cantilever attachment to a shaft and hub assembly 58 which is journaled in bearings 60 mounted in a housing 62 to the top of the cover 12. Rotation of the shaft and hub assembly with disk 56 would be as described relative to the embodiment of FIGURES 1 and 2.

Opposite the aperture containing the housing 50, there is provided an aperture in the cover 12 of the casing 10 over which is mounted a prism 64 having a reflecting surface 66 to direct the light at a 90° angle to the original axis of the rays. A lens 32 is provided on this orthogonal axis to focus the light to a photomultiplier bank as described relative to the embodiment of FIGURES 1 and 2. A housing 68 on the cover plate 12 protects the lens arrangement 64, 32.

With a disk 54 of film applied to either side of rotating disk 56, the film disk having the memory punched or otherwise applied thereto, the memory is made to rotate by means of rotation of shaft 58. The light source 26 is applied thereto and the bits of information are presented to the prism 64 and applied to a photodiode unit by means of lens 32. Of course, it is understood that the disk 56 should have a transparent portion adjacent the apertures containing the lens in order to allow passage of light therethrough. A pair of suitably located passageways 70 are provided in order to project streams of air by a conventional compressor means against the film disk 54 in order to stabilize it on the film supporting disk 56. Alternatively, conventional film clip means could be arranged to assure rotation of the film with the rotating disk 56.

This embodiment could utilize optical fibers in place of the lenses 52 and prism 64 to direct the light from the source 26 to and through the film and from the film to the bank of photodiodes.

Thus, a system has been described wherein the optical elements remain fixed and the memory is made to move so as to bring raster after raster of bits into contact with optical elements which in turn bring their images to the photoelectric cells for application to a computer.

It should be noted that changing the memory is all that is required to adapt the computer to any other equation for which a memory has been prepared.

Although the invention has been described with reference to particular embodiments, it will be understood to those skilled in the art that the invention is capable of a variety of alternative embodiments within the spirit and scope of the appended claims.

I claim:

1. A nomographic computer scanning means for presentation of a light picture of a film memory containing countable bits thereon comprising, cantilever supported means for supporting and rotating said film memory, fixed optical means on both sides of said film, one of said opticay systems presenting light to said film for projection therethrough where bits of information are stored, and the other of said optical systems receiving the light from said film for presentation to a means for conversion of the light images of said countable bits to electrical potentials.

2. A scanning means as defined in claim 1 wherein said film memory is arranged in the form of a cylinder and mounted within said support.

3. A scanning means as defined in claim 1 wherein said film memory comprises a flat disk and including means for directing compressed air at said flat disk for stabilizing the film memory thereon.

4. A nomographic computer scanning means for presentation of a light picture of a film memory containing countable bits thereon comprising, a housing, means mounted within said housing for supporting a film memory, said support being in the form of a cylinder, shaft means attached cantilever fashion to said film memory support for rotation thereof, bearing means mounted on said housing for journaling said shaft, optical means mounted within said housing and on the central axis of said cylinder for projecting light normal to the axis of said cylinder such that light is impinged upon said film and is projected therethrough where countable bits of information are recorded, and optical means mounted within said housing for reception of light which is passed through said film, said last-mentioned optical means focusing the image of said bits upon a means for conversion of said light images into electrical potentials.

5. A nomographic computer scanning means for presentation of a light picture of a film memory in the form of a disk and containing countable bits thereon comprising, a housing, a support disk for said disk of film mounted for rotation in said housing, said rotation being provided by a shaft secured in cantilever fashion to said disk and journaled in said housing, said support disk having a transparent portion adjacent its outer periphery, optical means on one side of said disk adjacent said transparent portion for projecting light through said disk and said film, and optical means opposite said first-mentioned optical means for receiving light which is projected through said film for creating an image of the countable bits on said film for utilization by a means for conversion of light images to electrical potentials.

References Cited

UNITED STATES PATENTS

| | | | |
|---|---|---|---|
| 2,199,948 | 5/1940 | Brockway | 250—219 |
| 2,635,195 | 4/1953 | Hancock | 250—219 |
| 3,178,699 | 4/1965 | Burton | 250—219 |
| 3,234,392 | 2/1966 | Dickinson | 250—219 |

OTHER REFERENCES

I.B.M. Technical Disclosure, "Program Device," vol. 4, No. 12, page 33, May, 1962.

RALPH G. NILSON, *Primary Examiner.*

M. A. LEAVITT, *Assistant Examiner.*